US009227486B2

(12) United States Patent
Dietl et al.

(10) Patent No.: US 9,227,486 B2
(45) Date of Patent: Jan. 5, 2016

(54) SHADING ARRANGEMENT FOR A VEHICLE HAVING TWO SHADING UNITS AND METHOD FOR MOUNTING A SHADING ARRANGEMENT

(71) Applicant: WEBASTO SE, Stockdorf (DE)

(72) Inventors: Rudolf Dietl, München (DE); Stefan Groitl, Seefeld (DE); Peter Reihl, Röhrmoos (DE)

(73) Assignee: WEBASTO SE, Stockdork (DE)

( * ) Notice: Subject to any disclaimer, the term of this patent is extended or adjusted under 35 U.S.C. 154(b) by 0 days.

(21) Appl. No.: 14/376,666

(22) PCT Filed: Jan. 31, 2013

(86) PCT No.: PCT/EP2013/051905
§ 371 (c)(1),
(2) Date: Aug. 5, 2014

(87) PCT Pub. No.: WO2013/120699
PCT Pub. Date: Aug. 22, 2013

(65) Prior Publication Data
US 2015/0027647 A1    Jan. 29, 2015

(30) Foreign Application Priority Data

Feb. 16, 2012    (DE) .......................... 10 2012 101 260

(51) Int. Cl.
*B60J 1/20*    (2006.01)
*B60J 7/00*    (2006.01)

(52) U.S. Cl.
CPC .............. *B60J 1/2086* (2013.01); *B60J 1/2019* (2013.01); *B60J 7/0015* (2013.01)

(58) Field of Classification Search
CPC .. E06B 2009/405; B60J 7/0015; B60J 7/0007
USPC ................ 160/241, 370.21, 370.22; 296/214, 296/216.01, 216.08, 219
See application file for complete search history.

(56) References Cited

U.S. PATENT DOCUMENTS 5,085,473 A * 2/1992 Yang .............................. 296/141
6,267,431 B1 * 7/2001 Watkins ....................... 296/97.4
(Continued)

FOREIGN PATENT DOCUMENTS

DE    19750715 C1    11/1998
DE    29723662 U1    11/1998
(Continued)

OTHER PUBLICATIONS

International Preliminary Report on Patentability/Written Opinion of the International Searching Authority dated Aug. 19, 2014 issued against International Application PCT/EP2013/051905.
(Continued)

*Primary Examiner* — Katherine Mitchell
*Assistant Examiner* — Johnnie A Shablack
(74) *Attorney, Agent, or Firm* — Fitch, Even, Tabin & Flannery LLP

(57) ABSTRACT

The invention proposes a shading arrangement having a first look-through region and a second look-through region, having a first shading unit for the first look-through region and a second shading unit for the second look-through region, wherein the two shading units include one shading element, respectively, on which a drive means either directly or indirectly acts on both sides, respectively at a lateral guide rail in relation to a vertical longitudinal center plane of the roof. On both sides, in relation to the vertical longitudinal center plane of the roof, one coupling tube is arranged, respectively, said coupling tube connecting the guide rails of the two shading units to one another, which are respectively arranged on one side of the vertical longitudinal center plane, and guiding the drive means of the second shading unit, which is driven by the drive means of the first shading unit.

8 Claims, 10 Drawing Sheets

(56) References Cited

U.S. PATENT DOCUMENTS

| | | | |
|---|---|---|---|
| 6,520,569 B2* | 2/2003 | Wingen et al. | 296/214 |
| 6,682,133 B2* | 1/2004 | Glasl | 296/216.01 |
| 6,805,402 B2* | 10/2004 | Pfalzgraf | 296/220.01 |
| 6,899,380 B2* | 5/2005 | Kralik et al. | 296/214 |
| 7,387,329 B2* | 6/2008 | Mollick et al. | 296/97.8 |
| 7,469,960 B2* | 12/2008 | Koelbl et al. | 296/214 |
| 7,537,276 B2* | 5/2009 | Koelbl et al. | 296/214 |
| 7,665,793 B2* | 2/2010 | Elbs et al. | 296/97.4 |
| 7,775,255 B2* | 8/2010 | Albert | 160/290.1 |
| 7,922,242 B2* | 4/2011 | Comfort et al. | 296/216.08 |
| 8,419,119 B2* | 4/2013 | Nakamura et al. | 296/214 |
| 8,590,593 B2* | 11/2013 | Kitani et al. | 160/370.22 |
| 8,678,488 B1* | 3/2014 | Kim | 296/214 |
| 8,814,258 B2* | 8/2014 | Comfort et al. | 296/216.01 |
| 9,004,146 B2* | 4/2015 | Zeo et al. | 160/370.22 |
| 2002/0000739 A1* | 1/2002 | Zonneveld et al. | 296/214 |
| 2002/0167202 A1* | 11/2002 | Pfalzgraf | 296/214 |
| 2004/0080189 A1* | 4/2004 | Schatzler et al. | 296/214 |
| 2007/0267898 A1* | 11/2007 | Lin | 296/214 |
| 2008/0023155 A1* | 1/2008 | Beierl et al. | 160/121.1 |
| 2011/0088855 A1* | 4/2011 | Boustani | 160/370.22 |
| 2011/0204682 A1* | 8/2011 | Kamei et al. | 296/216.04 |
| 2012/0168100 A1* | 7/2012 | Kitani et al. | 160/370.22 |
| 2013/0341972 A1* | 12/2013 | Choi et al. | 296/214 |
| 2014/0354017 A1* | 12/2014 | Nabuurs et al. | 296/216.04 |
| 2015/0027647 A1* | 1/2015 | Dietl et al. | 160/370.22 |
| 2015/0028630 A1* | 1/2015 | Grimm et al. | 296/213 |

FOREIGN PATENT DOCUMENTS

| | | |
|---|---|---|
| DE | 10322709 B3 | 3/2005 |
| DE | 102008013067 A1 | 9/2009 |
| DE | 102008046333 A1 | 3/2010 |

OTHER PUBLICATIONS

International Search Report dated Mar. 14, 2013, issued in International Application No. PCT/EP2013/051905.

* cited by examiner

SHADING ARRANGEMENT FOR A VEHICLE HAVING TWO SHADING UNITS AND METHOD FOR MOUNTING A SHADING ARRANGEMENT

CROSS REFERENCE TO RELATED APPLICATIONS

This application is a U.S. National Stage Application filed under 35 U.S.C. §§371 of International Application No. PCT/EP2013/051905, filed Jan. 31, 2013, designating the United States, which claims benefit of the priority date of German Application 10 2012 101 260.1, filed Feb. 16, 2012, which are hereby incorporated herein by reference in their entirety.

The invention relates to a shading arrangement for a vehicle roof having a first look-through region and a second look-through region as well as having a shading arrangement according to the preamble of claim 1 as well as to a method for mounting the shading arrangement at a vehicle roof.

Such a shading arrangement is known from practice and comprises, for a first look-through region, a first roller blind unit as a shading unit and, for a second look-through region, a second roller blind unit as a shading unit. The two look-through regions which are arranged one behind the other in the longitudinal direction of the vehicle are separated from each other by a transverse strut. The two roller blind units each include one roller blind web, respectively, which, in the wound-up state, can be unwound from a winding shaft or, in an unwound state, with the aid of a spring device, can automatically be wound up onto the winding shaft. The two roller blind webs each include a tension bow at a free front edge thereof, as seen in the unwinding direction, the ends of said tension bows respectively being guided in a lateral guide rail in relation to a vertical longitudinal center plane of the roof. For unwinding the roller blind webs from the respective winding shaft, a drive means acts on the relevant tension bow, which drive means is designed as a drive cable, and which can in particular be actuated by an electric motor.

In the known system, there is the problem that the two roller blind webs cannot be driven by means of a single drive motor anymore since the two look-through regions are separated from each other by the transverse strut.

It is the object of the invention to create a shading arrangement of the type referred to in the introduction, in which a coupling of the two shading units for the common drive thereof is also guaranteed when a vehicle transverse strut exists which separates the look-through regions, as well as a method for mounting such a shading arrangement at a vehicle roof.

In accordance with the invention, this object is attained by the shading arrangement having the features of claim 1 and by the method having the features of claim 9.

The essence of the invention therefore is that the guide rails of the two shading units are connected to one another via coupling tubes, via which it is possible to couple the drive means of the first shading unit to the drive means of the second shading unit. The coupling tubes constitute one guide means, respectively, at least for the drive means of the second roller blind unit, and can reach through vehicle components such as transverse struts or supports. Through the coupling tubes, an exact relative position of the two shading units with respect to each other can further be defined.

In a preferred embodiment of the shading arrangement according to the invention, the drive means of the first roller blind unit are formed from one drive cable, respectively, which is rigid in compression, wherein an exit end of the respective drive cable which is rigid in compression, for driving the second shading unit, takes effect on the respective drive means thereof, which drive means is designed to be rigid in compression and is arranged in the respective guide rail of the second shading unit. In other words, the exit ends of the drive cables of the first shading unit, with their end faces, press against end faces of the drive means of the second shading unit which are rigid in compression, such that actuation of a drive motor for the drive cables of the first shading unit which are rigid in compression leads to the shading element of the second shading unit being adjusted either in the shading direction or in the non-shading direction.

In a preferred embodiment, the shading elements are formed from one roller blind web, respectively, being adjustable between a wound-up rest position and an at least partially unwound shading position and including a tension bow at a front edge, as seen in the unwinding direction, which tension bow is respectively guided in one of the guide rails with its ends and on which tension bow the respective drive means acts.

The roller blind webs of the two roller blind units are in particular automatically wound up with the aid of a spring device. The spring device, for example, is a winding spring which is integrated in a winding shaft, and which takes effect in the winding-up direction, and/or which, in a roller blind web being guided at the side, is formed by roller springs that are arranged at the side and connected to the roller blind web.

Alternatively, the shading elements can also be formed by a sliding headliner or by a sliding cloth element.

In order to guarantee that the shading units work properly, the drive means of the second shading unit which are rigid in compression, in each shading position of the second shading unit, respectively at least partially move (sink) into the respective coupling tube. Hence, for guiding the drive means of the second shading unit, the coupling tubes might be sufficient. An exactly designed guideway for the drive means of the second shading unit might be unnecessary.

In order to be able to realize, when mounting the two shading units in the vehicle roof, the coupling of the guide rails via the coupling tubes in a simple manner, the coupling tubes, in the state in which they are delivered, are preferably slid into one of the two guide rails which are arranged one behind the other in the longitudinal direction of the vehicle. When mounting, the same are then shifted until they move (sink) into the other of the two guide rails which are arranged one behind the other. In order to define the final position, the coupling tubes are preferably latched in this position.

In the case of a transverse strut which separates the two look-through regions from each other, the coupling tubes can reach through, over or under the transverse strut. Hence, despite the transverse strut, a coupling of the drive of the two roller blind units is guaranteed via the coupling tubes.

In order to guarantee a positionally accurate coupling of the drive means of the two shading units, the exit ends of the drive cables of the first shading unit are guided in one guide channel of the respective guide rail of the first shading unit, respectively, and the respective coupling tube is an extension of said guide channel in the direction of the second shading unit. Hence, in operation, the exit ends of the drive cables have to traverse only one joint, respectively, between the respective coupling tube and the guide channel which is designed in the guide rail. The coupling tubes might engage the guide rails of the first shading unit until they also form the guide channels for the exit ends in the guide rails.

In an embodiment of the shading arrangement according to the invention which is particularly simply to realize, the drive means of the second shading unit are formed from one bendable rod, respectively, which is preferably made of plastic, and which is connected to the second shading unit, in particular to the tension bow thereof, and forms a connecter that interacts with the drive means of the first shading unit. Alternatively, a drive cable which is rigid in compression could also be utilized as the drive means for the second shading unit.

Subject-matter of the invention is also a method for mounting the above-described shading arrangement at a roof of a vehicle. In this method, the first shading unit is inserted into a first roof portion and the second shading unit is inserted into a second roof portion. The shading element of the second shading unit has at least partially been brought into a shading position. Here, the coupling tubes are received by the guide rails of the second shading unit. Subsequently, the coupling tubes are shifted, such that the guide rails of the two shading units, which guide rails, in relation to a vertical longitudinal center plane, are arranged on both sides, are connected to one another via the respective coupling tube and the respective drive means of the second shading unit, which drive means is rigid in compression, continuously moves (sinks) into the respective coupling tube that constitutes a connecter of the shading units.

As already explained above in connection with the claimed shading arrangement, the shading elements can be formed from one roller blind web, respectively, being adjustable between a wound-up rest position and an at least partially unwound shading position and including a tension bow at a front edge, as seen in the unwinding direction, which tension bow is respectively guided in one of the guide rails with its ends and on which tension bow the respective drive means acts.

In the method according to the invention, the coupling tubes, by means of the tension bow, preferably by means of a spring force which is exerted by a winding spring, are then shifted for coupling to the first roller blind unit. For example, the second roller blind unit is inserted into the second roof portion, with the tension bow retained in the extended position. If the first roller blind unit is also inserted into the first roof portion, the retention of the tension bow can be released, such that the roller blind web of the second roller blind unit is wound up and the tension bow is traversed against the coupling tubes and shifts the same into their final position. In the final position, the coupling tubes are preferably latched. For example, latching collars of the coupling tubes then engage corresponding latching grooves.

Further advantages and advantageous configurations of the subject-matter of the invention can be taken from the description, from the drawings and from the claims.

In the drawings, one exemplary embodiment of a shading arrangement according to the invention and mounting of a shading arrangement at a vehicle roof are illustrated in a schematically simplified way and will be explained in more detail in the following description. In the figures.

Figure 1:
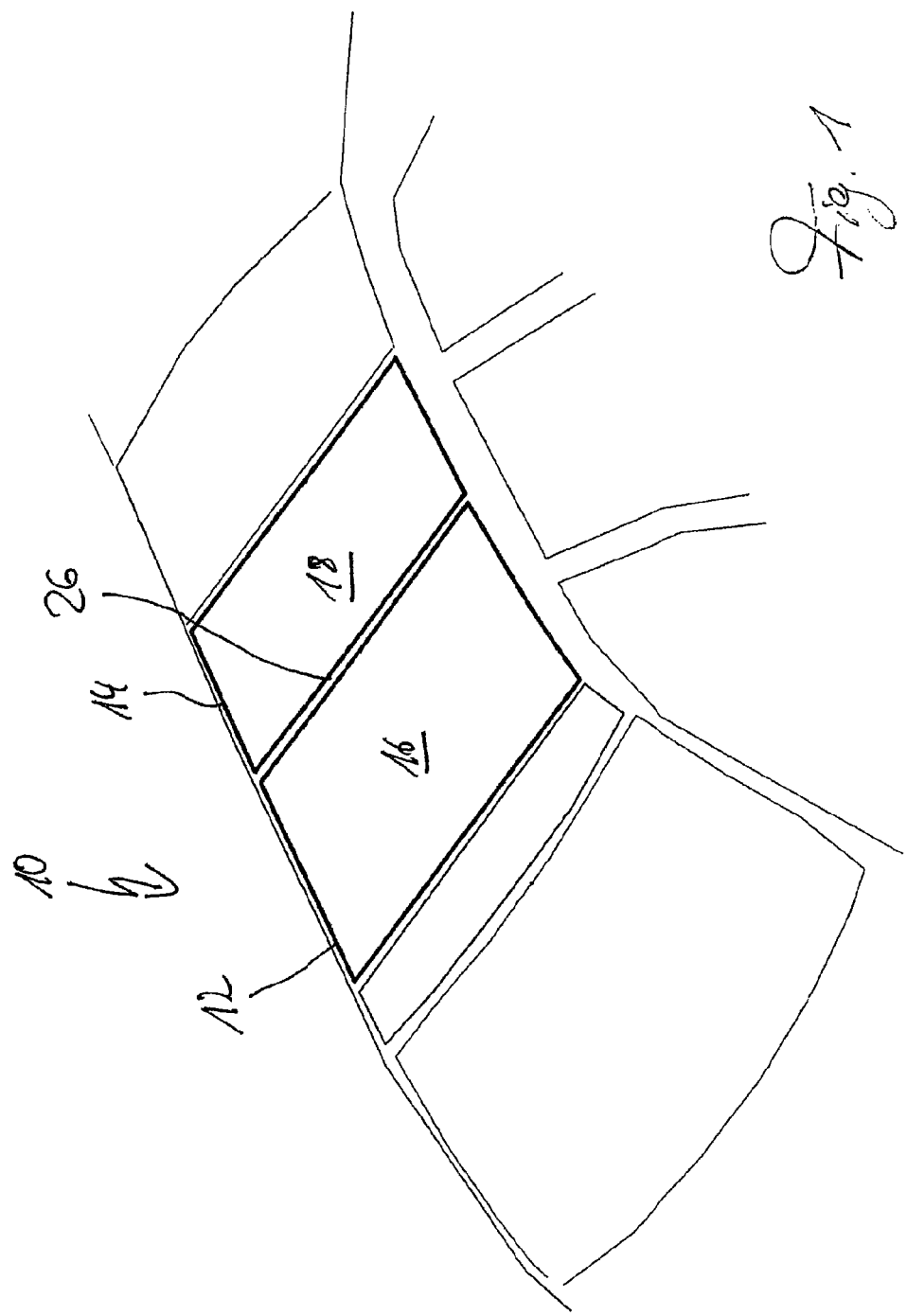
FIG. 1 shows a schematic perspective top view of a vehicle roof according to the invention.

In the drawing, a vehicle roof 10 of a passenger car is illustrated, which is provided with two transparent roof portions 12 and 14 which constitute one roof look-through region, respectively. The transparent front roof portion 12 is formed by a sliding roof cover 16 being adjustable between a closed position covering a roof opening and an open position uncovering said roof opening and consisting of glass. The rear roof portion 14 is formed by a fixed glass pane 18.

Figure 2:
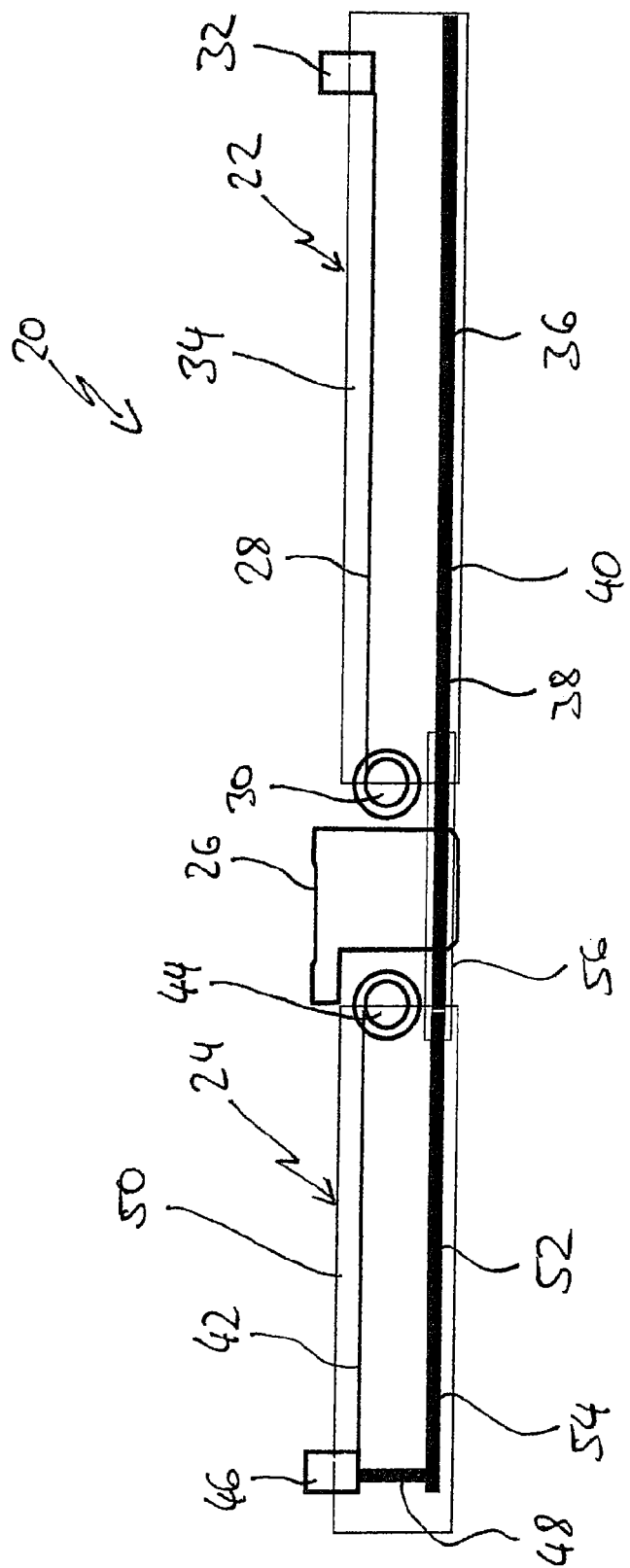
FIG. 2 shows a schematic side view of a roller blind arrangement of the vehicle roof.
Figure 3:
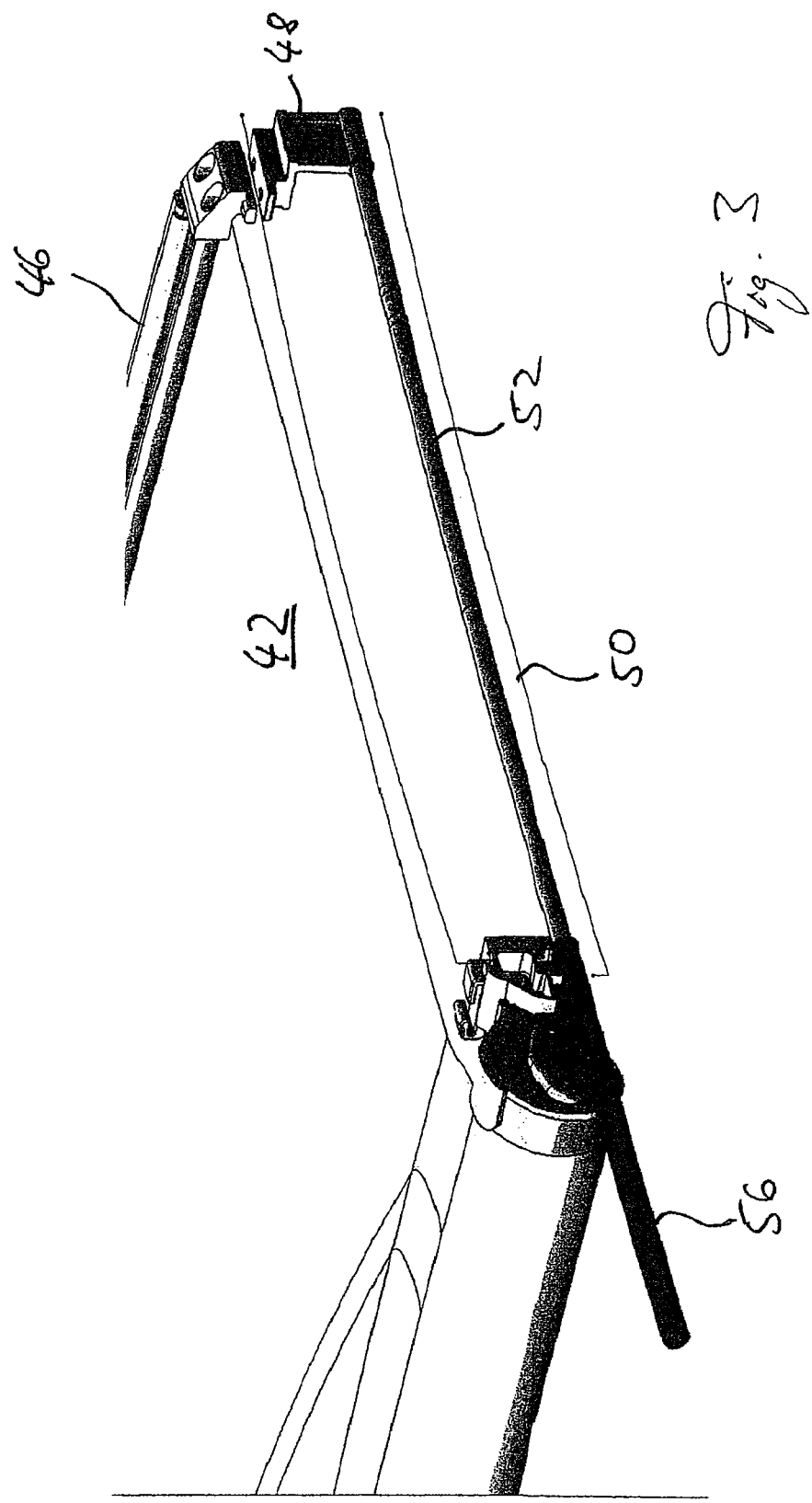
FIG. 3 shows a perspective side view of a second roller blind unit of the roller blind arrangement in the extended state of a roller blind web.
Figure 4:
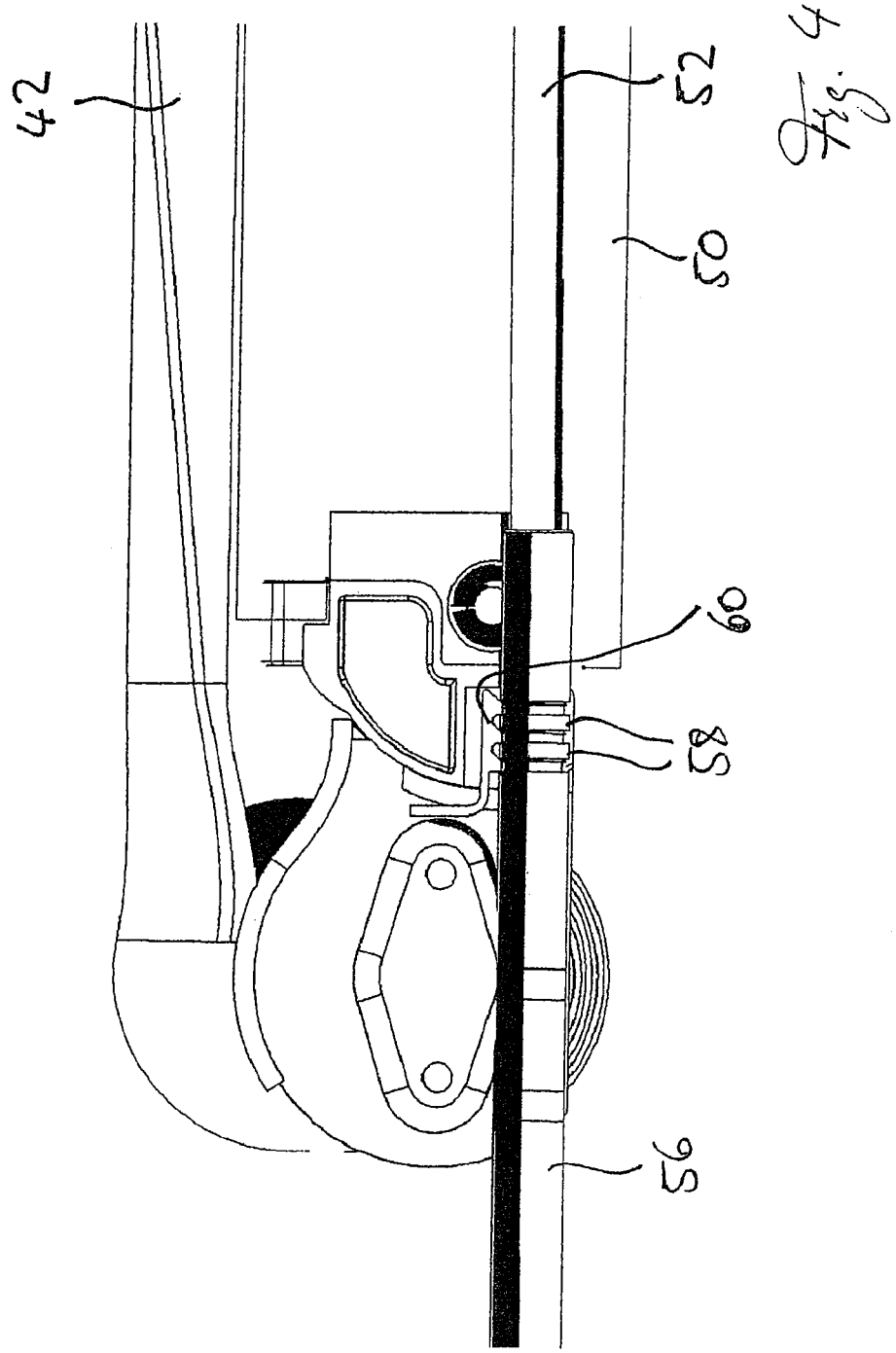
FIG. 4 shows a side view of the second roller blind unit in the region of a winding shaft.
Figure 5:
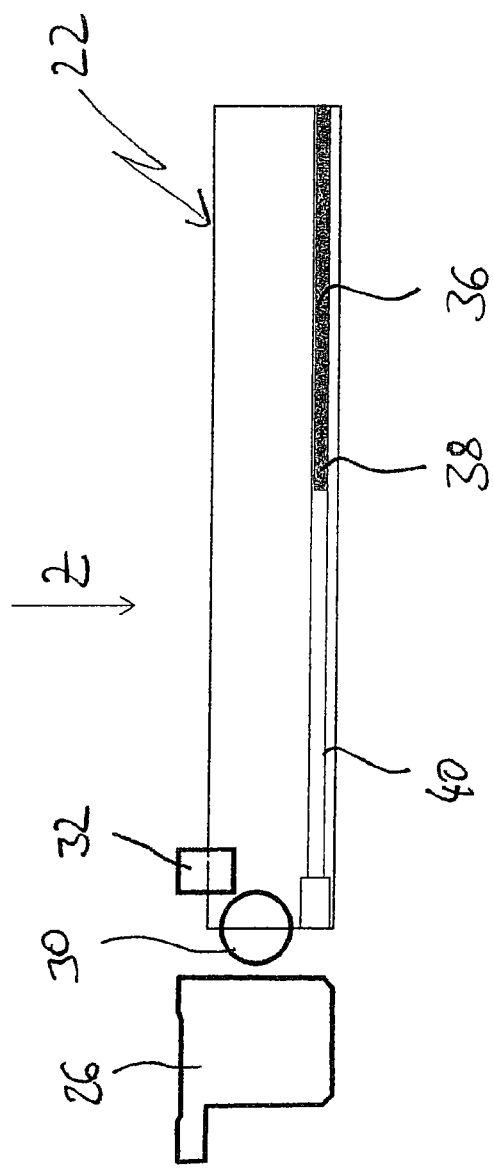
FIG. 5 shows a first step in the mounting process of the roller blind arrangement at the vehicle roof.
Figure 6:
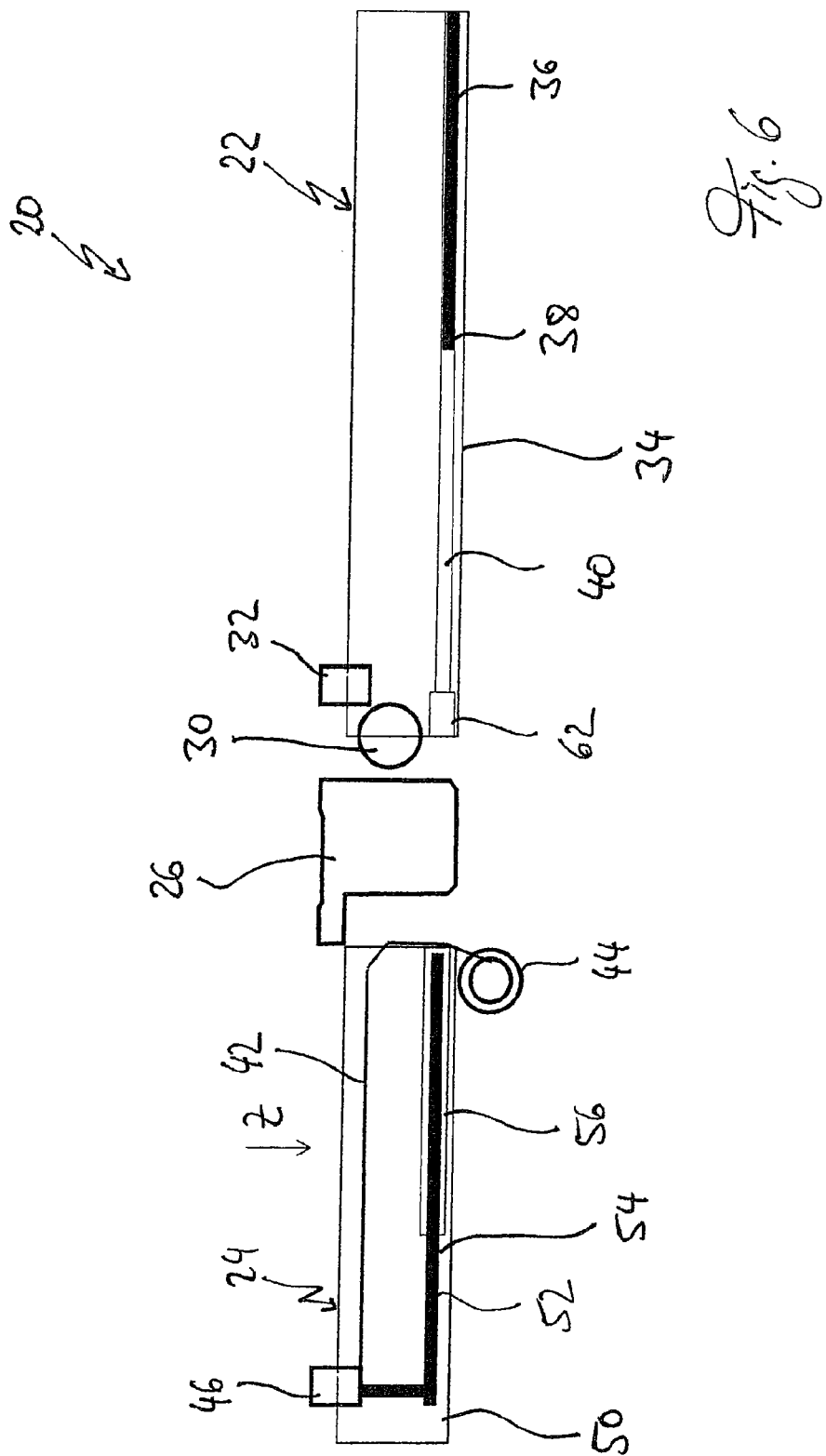
FIG. 6 shows a second mounting step.

For shading the transparent roof portions or roof look-through regions 12 and 14, the vehicle roof includes a roller blind arrangement 20 which is in particular illustrated in FIG. 2, and which comprises a first roller blind unit 22, being assigned to the front roof portion 12, or rather to the roof portion 12 that is arranged in the front, and a second roller blind unit 24, being assigned to the rear roof portion 14, or rather to the roof portion 14 that is arranged in the rear. A transverse strut 26 extending in the transverse direction of the vehicle is arranged between the two roller blind units 22 and 24 which constitute one shading unit, respectively, said transverse strut separating the two roof portions 12 and 14 from each other and constituting a transverse support of the vehicle structure or body shell.

The first roller blind unit 22 comprises a roller blind web 28 as the shading element, which roller blind web can be wound up onto a winding shaft 30 or unwound from the same. At its edge facing away from the winding shaft 30, the roller blind web 28 is provided with a tension bow 32 that is guided, at its lateral ends in relation to a vertical longitudinal center plane of the vehicle, in one front guide rail 34, respectively. For actuating the tension bow 32, the same, at its ends, is connected to one drive cable 36, respectively, in the region of the guide rails 34. The two drive cables 36 of the tension bow 32 respectively engage with a drive pinion of a drive motor which is not illustrated in more detail here.

For winding the roller blind web 28 up onto the winding shaft 30, a winding spring is arranged in the winding shaft 30, which winding spring is not illustrated in more detail, either, and which pretensions the winding shaft 30 into the winding-up direction. When unwinding the roller blind web 28 from the winding shaft 30, the drive cables 36 therefore take effect against the spring force of the winding spring of the winding shaft 30, said drive cables being connected to the tension bow 32.

Moreover, the drive cables 36 include one exit end 38, respectively, which is guided in one of the guide rails 34 in a guide channel 40. The drive cables 36 therefore are respectively fastened on one side of the tension bow 32, whereas the relevant exit end 38 is guided in the guideway 40 of the guide rail 34 which is assigned to the other side or to the other end of the tension bow 32.

The roller blind unit 24, as the shading element, includes a roller blind web 42 which can also be wound up onto a winding shaft 44 being pretensioned in the winding-up direction of the roller blind web 42 by means of a winding spring. At the edge facing away from the winding shaft 44, the roller blind web 42 is provided with a tension bow 46 that is guided in rear guide rails 50 via end regions 48 which, in relation to the vertical longitudinal center plane of the vehicle, are arranged on both sides.

The end regions 48 of the tension bow 46 are connected to one drive rod, respectively, which is made of plastic, and which constitutes a drive means for the tension bow 46, extends in the direction of the vehicle front starting from the respective end region 48 and, in the guide rail 50 assigned thereto, is guided in a corresponding guideway 54.

The drive rods 54 respectively move (sink) into a coupling tube 56, said coupling tube connecting the guide rails 34 and 50 of the two roller blind units 22 and 24 to one another, which are respectively arranged on one side of the vertical longitudinal center plane of the vehicle. The coupling tubes 56 are respectively latched at the relevant rear guide rail 50 and move into the relevant front guide rail 34 without latching, the guide rail substantially being aligned with the guide rail 50, such that the coupling tubes respectively are an extension of the guide channel 40 for the exit end 38 of the relevant drive cable 36 in the rear direction of the vehicle. The coupling tube 56 has an inside diameter which substantially corresponds to the diameter of the guide channel 40 of the guide rail 34 and to the diameter of the drive cable 36.

For latching at the relevant guide rail 50, the coupling tube 56 includes latching fins 58 which engage with a latching tab 60.

As it can in particular be taken from FIG. 2, the end face of the exit end 38 of the drive cable 36 takes effect on the end face of the drive rod 52 of the roller blind unit 24, said end face facing away from the tension bow 46, such that, when the drive cable 36 is actuated, the roller blind webs 28 and 42 are simultaneously unwound from the winding shafts 30 and 44 or the roller blind webs 28 and 42 are simultaneously wound up onto the winding shafts 30 and 44. The roller blind web 42 is therefore also driven by means of the drive motor for the drive cables 36 of the first roller blind unit 22.

The roller blind arrangement 20 is mounted in the manner which is described in the following.

In a first mounting step, the roller blind unit 22 that constitutes a first module is inserted into the roof portion 12 from above, that is to say in the mounting direction Z. Here, the roller blind web 28 is completely wound up onto the winding shaft 30. The exit end 38 of the drive cables 36 is spaced apart from a rear outlet opening of the guide channel 40.

In a next mounting step, the roller blind unit 24 that constitutes a second module is also inserted into the second rear roof portion 14 from above, that is to say in the mounting direction Z. Here, the roller blind web 42 has been unwound into an extended position from the winding shaft 44, which is swung away. The tension bow 46 is retained in the position assigned thereto by means of a retaining pin. The drive rods 52 are completely received by the guide rails 50 and move into the coupling tubes 56. The coupling tubes 56 are slid into the guide rails 50.

Figure 7:
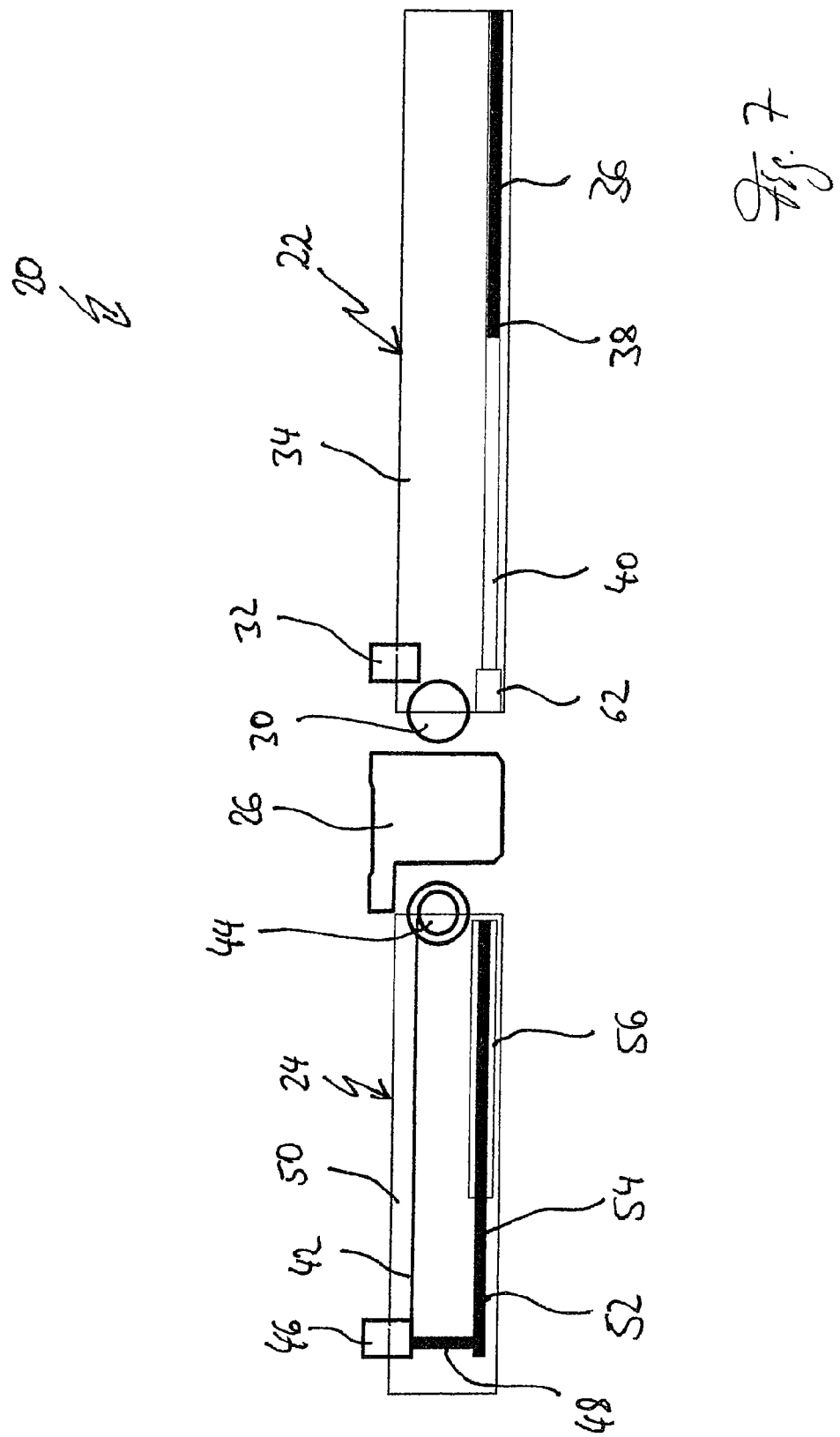
FIG. 7 shows a third mounting step.
Figure 8:
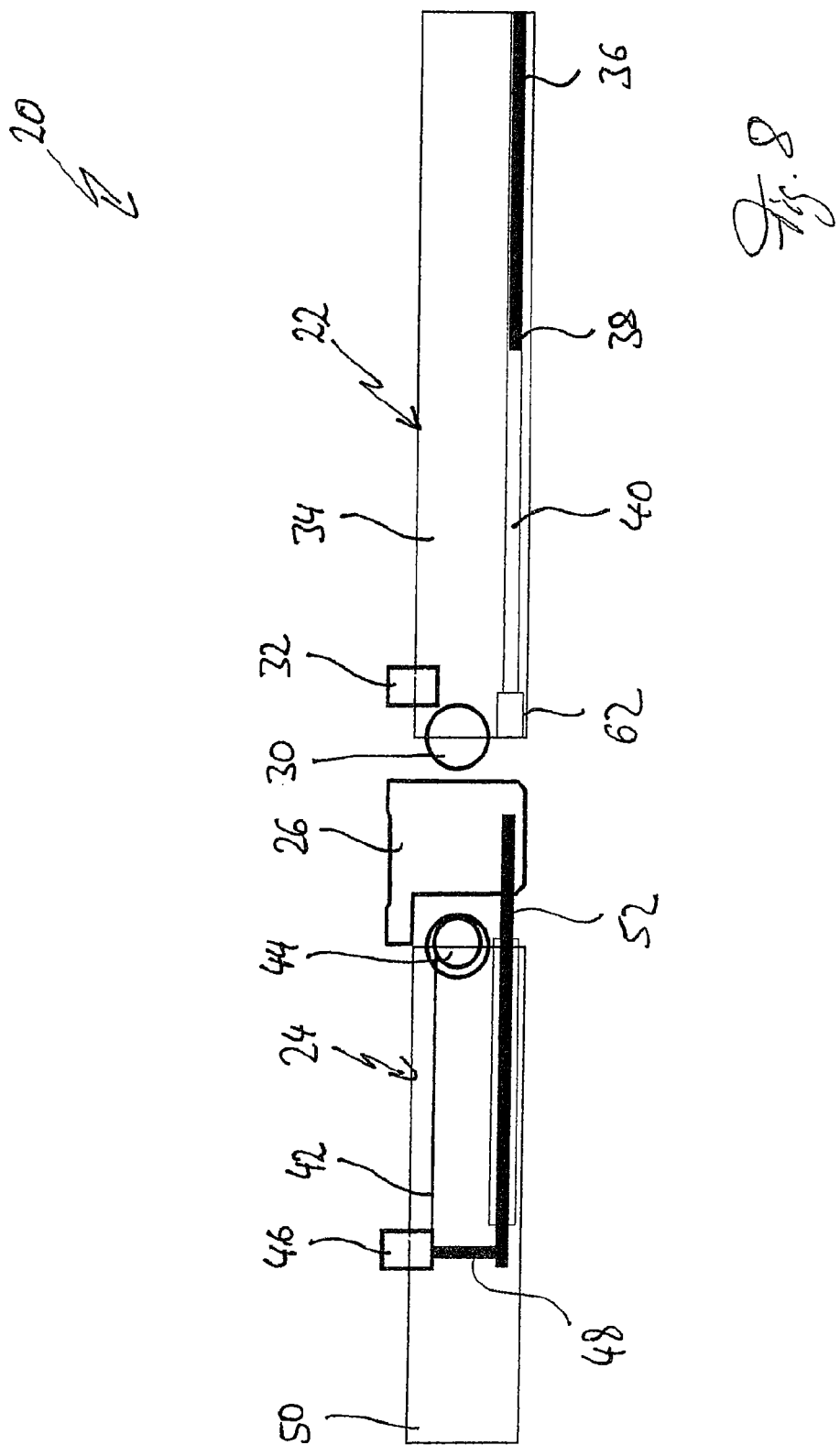
FIG. 8 shows a fourth mounting step.
Figure 9:
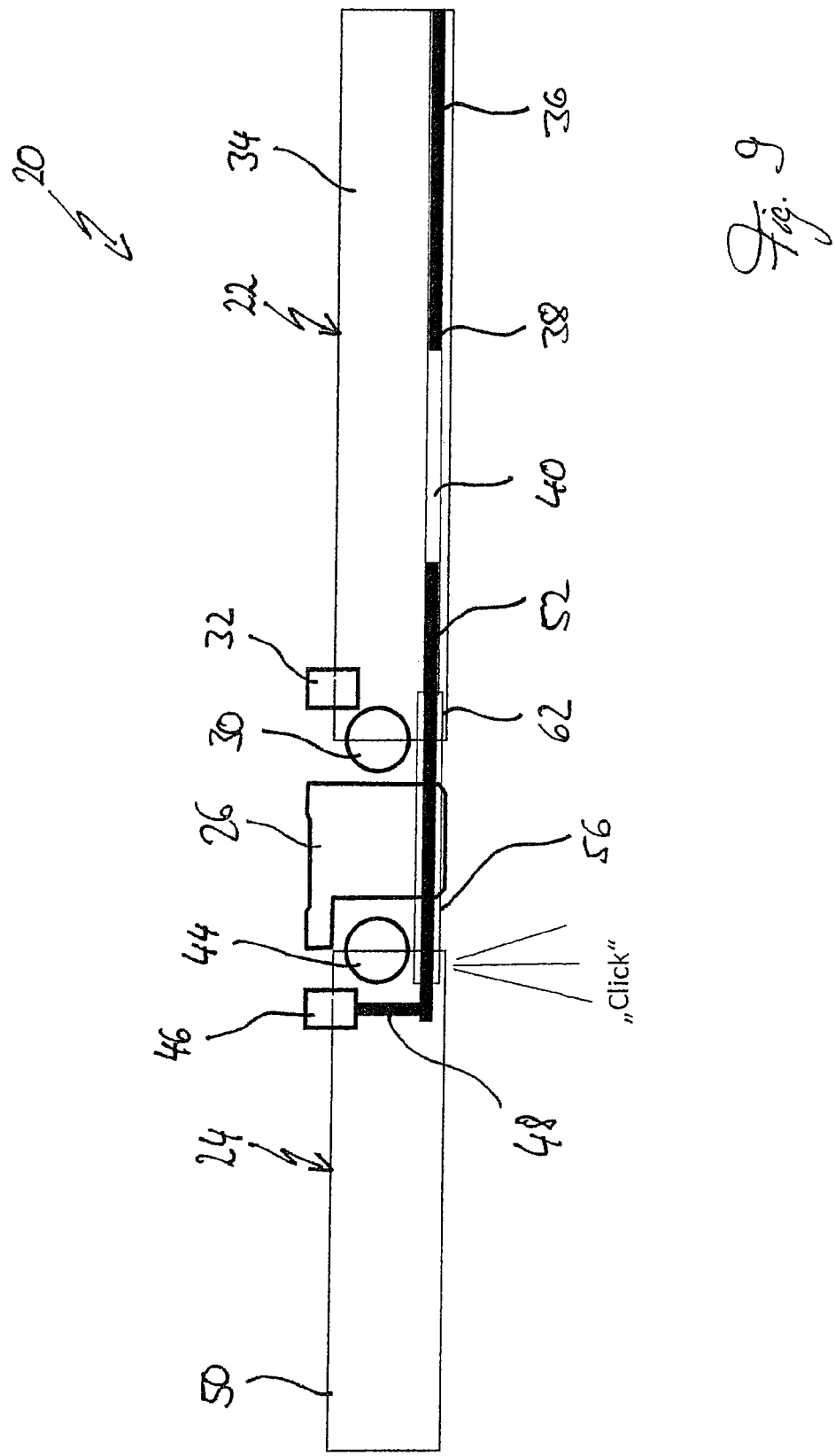
FIG. 9 shows a fifth mounting step.

Subsequently, as it is illustrated in FIG. 7, the winding shaft 44 is swung to the top, that is to say into the operating position, whereupon the retaining pin of the tension bow 46 is pulled out, such that the roller blind web 42 is wound up onto the winding shaft 44. Hence, the drive rods 52 are traversed in the direction of the first roller blind unit 22, wherein, as it is illustrated in FIG. 9, the end regions 48 of the tension bow 46 take effect as drivers for the coupling tubes 56, such that the latter, through openings of the transverse strut 26, are pressed in the direction of the first roller blind unit 22 until they are latched at latching tabs 60 of the second roller blind unit 24 by means of the latching fins 58, in a final position, and, with their ends facing away from the second roller blind unit 24, move into corresponding openings 62 of the respectively corresponding guide rail 34 of the first roller blind unit 22 without latching.

Figure 10:
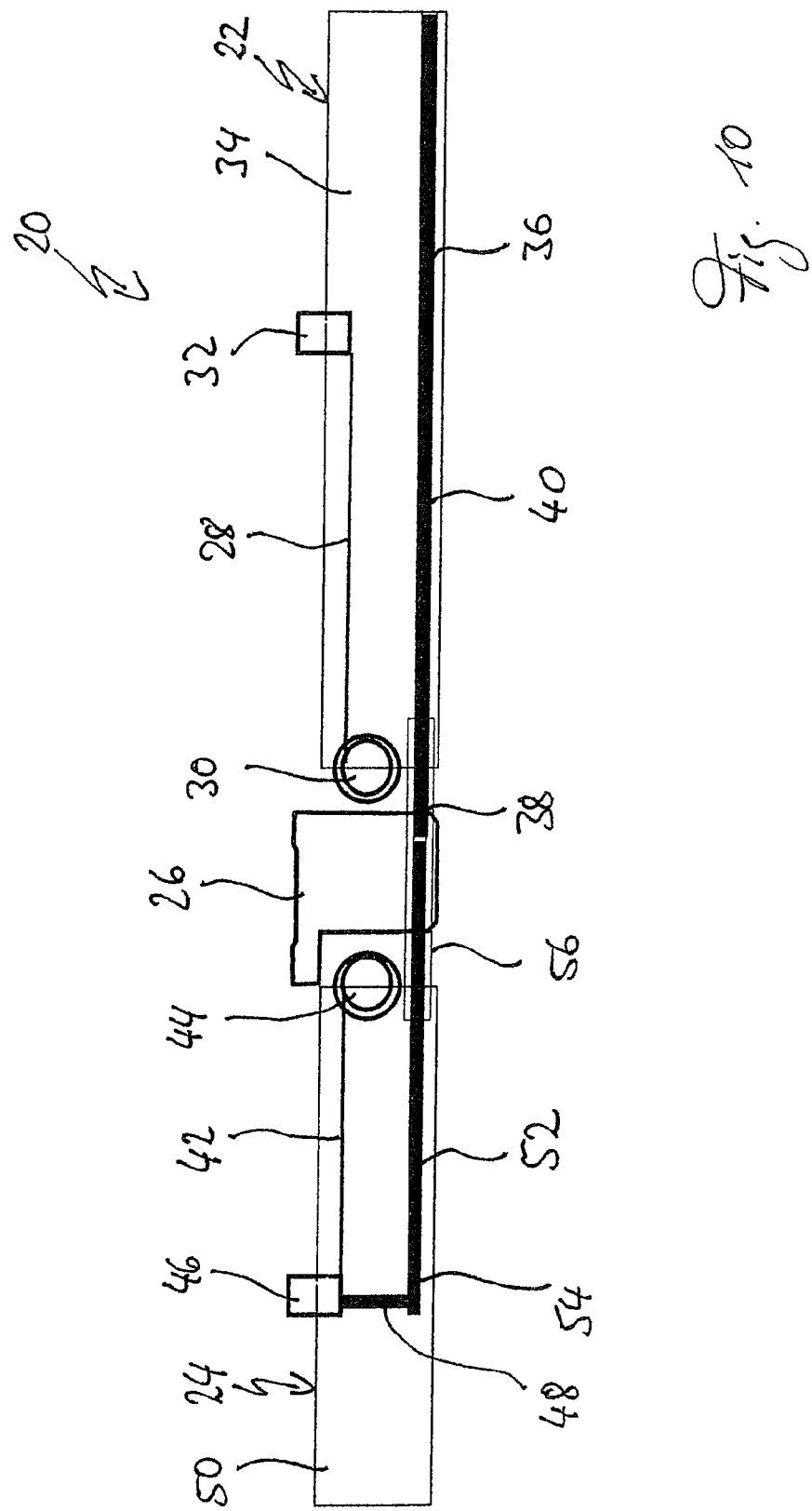
FIG. 10 shows the roller blind arrangement having semi-extended roller blind webs.

If, as it is illustrated in FIG. 10, the drive cables 36 of the first roller blind unit 22 now are actuated by means of the drive motor for shading the first roof portion 14, the end faces of the exit ends 38 of the drive cables 36 are traversed against the ends of the drive rods 52 facing away from the tension bow 46, such that the roller blind web 42 of the second roller blind unit 24 is also brought into an shading position.

In accordance with the invention, the roller blind units 22 and 24 are thus connected through the coupling tubes 56, which are initially slid into the guide rails 50 and which, after the roller blind unit 24 has been inserted into the relevant roof portion 14, positively connect the two roller blind units 22 and 24 or the guide channels thereof for the drive means 36, 52, by winding the roller blind web 42 up for the first time.

The invention claimed is:

1. A shading arrangement for a roof having a first look-through region and a second look-through region, the arrangement comprising:
    a first shading unit for the first look-through region and a second shading unit for the second look-through region,
    wherein the first and second shading units each include a planar shading element, respectively, on which each has a drive linkage which either directly or indirectly acts on both first and second shading units, respectively within a lateral guide rail in each of the first and second shading units in relation to a vertical longitudinal center plane of the roof,
    wherein in relation to the vertical longitudinal center plane of the roof, a coupling tube connects the guide rails of the first and second shading units to one another, which are respectively arranged on each side of the vertical longitudinal center plane of the roof, which guide the drive linkage of the second shading unit, which is driven by the drive linkage of the first shading unit, and
    wherein the drive linkages of both the first and second shading units are guided within the coupling tube so that an end face of the drive linkage of the first shading unit abuts against an end face of the drive linkage of the second shading unit.

2. The shading arrangement according to claim 1, wherein the drive linkage of the second shading unit is non-compressible and is configured to at least partially extend into the coupling tube.

3. The shading arrangement according to claim 1, wherein the coupling tube extends through, over or under a transverse strut of the vehicle roof, said transverse strut separating the two look-through regions from each other.

4. The shading arrangement according to claim 1, wherein the drive linkage of the second shading unit is formed from one bendable rod.

5. The shading arrangement according to claim 1, wherein the shading elements of the first and second shading units are each a roller blind including a tension bow at a front edge, each front edge being in an unwinding direction of the roller blind, each tension bow is guided in the respective guide rails at its edges and driven by the respective drive linkage.

6. The shading arrangement according to claim 1, wherein the respective drive linkage of the first shading unit is a non-compressible drive cable, and an exit end of said drive cable drives the second shading unit, wherein said drive cable takes effect on the drive linkage of the second shading unit, which is non-compressible and is arranged in the guide rail of the second shading unit.

7. The shading arrangement according to claim 6, wherein the drive linkage of the first shading unit is guided in the guide rail of the first shading unit and wherein the coupling tube is an extension of said guide rail in the direction of the second shading unit.

8. A method for mounting the shading arrangement of claim 1 onto a vehicle roof, comprising:

inserting the first shading unit into a first roof portion;

inserting the second shading unit into a second roof portion, wherein the shading element of the second shading unit has at least partially been brought into a shading position and the coupling tube of each vehicle side is received by the guide rail of each vehicle side of the second shading unit; and shifting each coupling tube, such that the guide rails of the two shading units, which guide rails, in relation to a vertical longitudinal center plane, are arranged on both first and second shading units, are connected to one another via the respective coupling tube and that the respective drive linkage of the second shading unit continuously moves into the respective coupling tube, wherein each drive linkage of the second shading unit is non-compressible.

\* \* \* \* \*